United States Patent [19]
Foster, Sr.

[11] Patent Number: 5,685,196
[45] Date of Patent: Nov. 11, 1997

[54] INERTIAL PROPULSION PLUS/DEVICE AND ENGINE

[76] Inventor: Richard E. Foster, Sr., 13849 Reed Ave., Baton Rouge, La. 70818

[21] Appl. No.: 683,051

[22] Filed: Jul. 16, 1996

[51] Int. Cl.⁶ .................... F16H 33/20; B62D 57/04
[52] U.S. Cl. .................... 74/84 R; 74/845; 180/7.1; 244/62; 244/172; 440/113
[58] Field of Search .................. 74/84 R, 84 S; 180/7.1; 244/62, 172; 440/113

[56] References Cited

U.S. PATENT DOCUMENTS

| | | | |
|---|---|---|---|
| 11,851 | 10/1854 | Atherton | 74/58 |
| 1,867,504 | 7/1932 | Franklin | 74/58 |
| 3,266,233 | 8/1966 | Farrall | 180/7.1 |
| 3,404,854 | 10/1968 | Di Bella | 180/7.1 X |
| 3,465,602 | 9/1969 | Garaud | 74/58 |
| 3,492,881 | 2/1970 | Auweele | 74/84 S |
| 3,653,269 | 4/1972 | Foster | 74/84 R |
| 4,674,583 | 6/1987 | Peppiatt et al. | 180/7.1 |
| 4,801,111 | 1/1989 | Rogers et al. | 180/7.1 X |
| 5,040,426 | 8/1991 | Wueller | 74/58 |

FOREIGN PATENT DOCUMENTS

| | | | |
|---|---|---|---|
| 959104 | 12/1974 | Canada | 74/84 R |
| 559565 | 9/1923 | France | 74/84 S |
| 1906960 | 8/1970 | Germany | 180/7 R |
| 401615 | 11/1945 | Italy | 180/7.1 |

OTHER PUBLICATIONS

Product Engineering; p. 63; Article titled "Inertial drive", Mar. 14, 1966.

Primary Examiner—Allan D. Herrmann

[57] ABSTRACT

Devices herein described utilize vehicles that are propelled, braked, and steered by means of a process called Inertial Propulsion Plus. This consists of a "power phase" to extend the weight(s) from the vehicle, alternated with a "null phase" to cancel out the return phase or stroke reactions. This process is made workable by selectively applying a pure external force derived from the pathway and opposing the movement of the weight(s) on the power phase. For non-travel-related applications, the inherent displacement can be harnessed by a treadmill or other ways for a power source to increase available power and reduce pollution.

7 Claims, 12 Drawing Sheets

INERTIAL PROPULSION PLUS/DEVICE AND ENGINE

DESCRIPTION OF RELATED ART

It seems there is a divergence of opinion as to the validity of these concepts. This applicant has attached a copy of some of his prior Disclosure Documents as adheres to accepted laws of science. But the mathematics and logic involved and some documentation data all point to its potential. The example of a simple weight midway of a stretched coil spring secured at both ends to a loose horizontal board displaced either direction and released returns to equilibrium without moving nor keep from moving the board; i.e., force=0. This experiment has worked every time and recognized as the "null phase" which obviously changes the center of gravity. This fact assured the validity of inertial propulsion in that it was all it needed to work. It is as though a single weight or $M_2$ is the secondary mass is both speeding up and slowing down simultaneously in its effect on $M_1$. The craft less the weight(s)=primary mass.

This "null phase" with the springs is effective on earth even on an incline including vertically. But the power phase requires some pure external force assist because upgrade $M_1$, the craft is more difficult to advance and the $M_2(s)$ weight(s) less able to do the task. This fact leads to the reality of hybrid systems.

Long ago, the belief was expressed that if someone could ever change the order of the sequence, accel, decel, etc., that self-contained propulsion might be possible. This "power phase" then "null phase" and so on alternately does just that. A one-weight model actually has two weights; i.e., the primary mass, $M_1$ the craft and one secondary mass, $M_2$ the weight(s). Of course, this application shows models with 2 & 3 $M_2$'s. The most likely mode for launch purposes beyond Lockheed Martin's X-33 would appear to be using gyroscopic propulsion since it will need only minimal pure external assist. But that will require powerful linear actuators and engines to manage the tumbling gyroscopes.

This applicant has cited his own gyroscopic propulsion U.S. Pat. No. 3,653,269 with some prior art at least with the same objectives. But no equivalent of the null phase to cancel out return reactions has been evident, nor has the application of pure external force derived from the pathway been found. Furthermore, the harnessing of the displacement for non-travel related tasks appears to be new art.

There have been other grooved cylinder prior art found but not for managing weights for propulsion. Some prior art found:

| 1. | Atherton | No. 11851 | 1854 |
|----|----------|-----------|------|
| 2. | Wueller | No. 5,040,426 | 1991 |
| 3. | Garaud | No. 3,465,602 | 1969 |
| 4. | Van Doren | No. 2,872,825 | 1959 |
| 5. | Franklin | No. 1,867,504 | 1932 |

BACKGROUND OF THE INVENTION

1. Technical Field

The field of endeavor of this invention appears to be for Art Group 3502 and represents efforts beginning in 1958 by this applicant to solve this problem. It deals with momentum drives using a craft $M_1$ and secondary mass ($M_2$'s) or weights that are separated and then returned for reuse to the craft called the primary mass or $M_1$. It was known that when one weight is pushed away from another, the craft, that if their mass ratios were, e.g. 10 to 1, the weight will move ten units distance and the craft one unit. It was discovered over time that there are a number of ways to return the weight $M_2$ for reuse without disturbing $M_1$.

This so called "null phase" obviously changes the center of gravity from within this multi-component system. These methods can advance the center of gravity for propulsion or retract it for braking. Laterally deployed ones can be used for steering and positioning. For propulsion, it requires the "power phase" which has the function of advancing the craft $M_1$ at the expense of a weight $M_2$ which goes rearward, and this does not change the center of gravity. This is common knowledge, but the "null phase" which is alternated with this "power phase" each cycle is new and different. There are eight general ways to do this and probably more.

This means that Newton meant a unitary or one component system when he said, "A body at rest or in motion tends to remain that way unless acted on by an external force." With a two or more component system, the forces between them are obviously external with respect to one another. So, this invention is only an extension of the common interpretation of Newton's laws. The "power phase" extends the masses apart, while the "null phase," whereby these return phase reactions cancel out, obviously does change the center of gravity of the system. This old type is alternated with a new type, and this opens up a new field of opportunities that are long overdue.

Figure 10A:
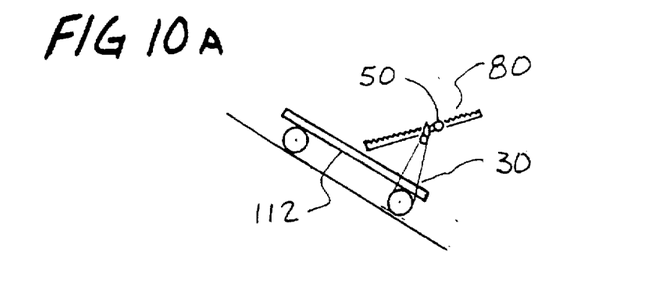
FIGS. 10A, 10B, 10C and 10D show various kinds of external force assists.

In gravity, a small jet or rocket can be used to initiate external assist which can be increased by an on-board multistage pilot unit for that purpose. On earth, these "Inertial Propulsion, Plus" units generally require a combination of existing forces exerted between the weights of the system and pure external force derived from the pathway. Examples are shown in FIGS. 10A, B, C and D. This external assist can make up any deficiencies in the force exerted between a weight $M_2$ and the craft. This yields a very useful hybrid system.

The above is true because up-grade $M_1$ is harder to lift and correspondingly, $M_2$ is less able to lift it. For vertical lift, it differs by one gravitational unit; i.e., 1 G. The difference required in this mix or blend is either enough pure external force to support the weight(s), not the entire craft, or else an amount proportional to the sine of the angle of incline.

Many people have sought to solve this elusive problem made more difficult by controversy which discouraged experimentation. But this breakthrough will set the record straight end open up the field for the development of other related technologies.

For non-travel-related applications, the net displacement inherent in Inertial Propulsion Plus can be harnessed to add to the power obtained from engines. It should be noted that for jets and rockets, although they are both power sources and propulsion means, over half of the input energy is wasted. So, in any event, these new hybrids should extend life of known energy reserves world wide and greatly reduce pollution.

SUMMARY OF THE INVENTION

As described in the background, this invention involves now workable systems of weights that are manipulated in a proven manner to achieve propulsion, braking and steering. It has the power phase to extend the craft from the weights, alternated with a null phase to advance the center of gravity, along with the application of external force from the pathway of the craft to make a workable combination or hybrid. A small excess of pure external force will result in higher velocity of the craft. For non-travel related processes, the inherent net displacement can be utilized to yield engines both reciprocating and rotary. The "null phase" together with the "power phase" allows the weight to be returned for reuse without any adverse effect on the craft and its related system. Many uses are visualized for these and other various systems in many applications.

BRIEF DESCRIPTION OF DRAWINGS

In all Drawings, the weight(s) represent the secondary mass $M_2$ 50 while the remainder of the craft is the primary mass $M_1$ 51.

DESCRIPTION OF THE DRAWINGS

The following drawings show the variety of apparatus utilizing a power phase whereby a weight is forced away from the advancing craft and a null phase to return the weight for reuse without any adverse effect on the craft. This null phase changes the center of gravity from within. All of the units shown do require an engine 10 or motor 10 as shown in the drawings. In a gravitational field, all require some external assist 30, 31, 32 generally exerted between the craft $M_1$ 51 and the weights $M_2$'s 50 and derived from the pathway. Thus $M_1$ is the device not including the weight(s) 50.

Figure 1A:
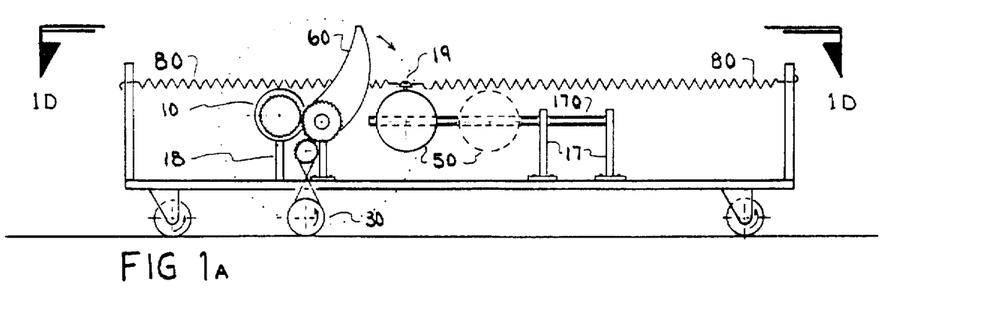
FIG. 1A and 1D show plan view and elevation view of one embodiment of the propulsion system.
Figure 1B:
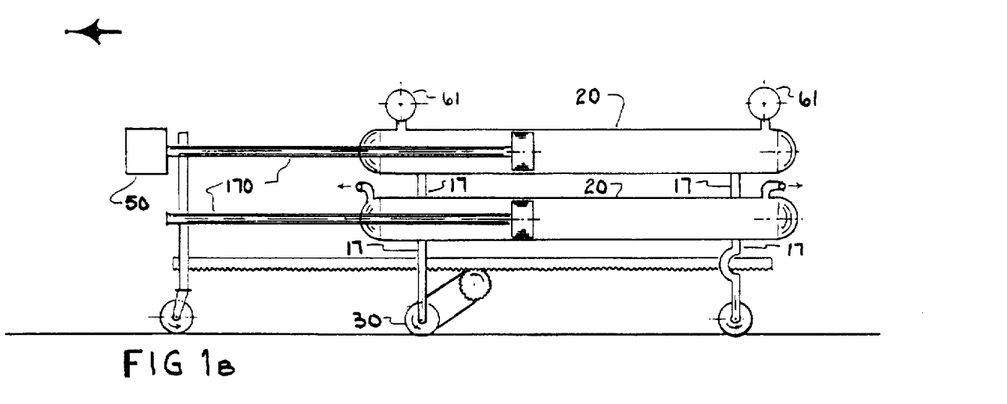
FIG. 1B shows a pneumatic version and FIG. 1C is an electromagnetic version.
Figure 1C:
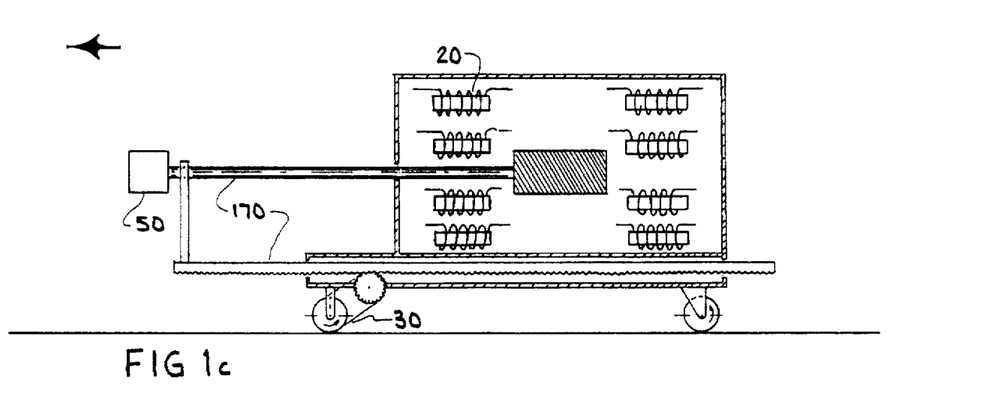
Figure 1D:
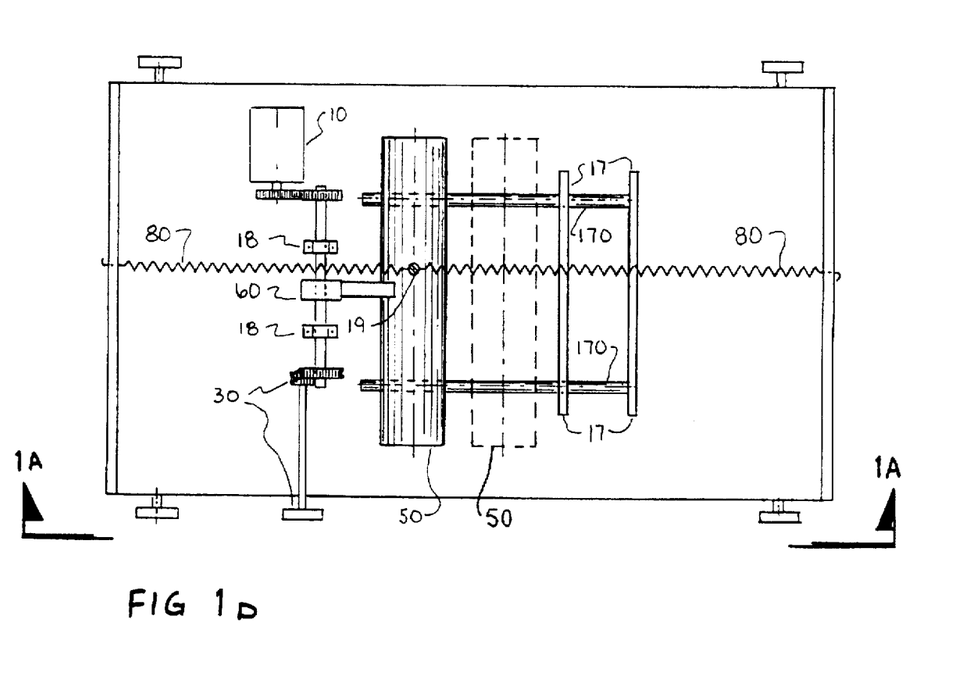

FIGS. 1A and 1D have a flipper 60 displacing weight 50, two inches to rear and on two polished steel rods 170 supported by posts 17 using linear bearings. Weight 50 is released and returned by pretuned springs 80 fastened to weight by threaded screw 19 to equilibrium with no effect on the model for the null phase. External assist 30 is given by small wheel in contact with floor. Powered by cordless screwdriver 10 via geared shaft 171 supported by posts 18, it travels to left as is the case with 1B and 1C and 1D also. FIG. 1B is pneumatic, being powered by compressed air. The upper cylinder 20 has a sealed pot reservoir 61 at each end and cancels return phase reactions. FIG. 1C is similar but uses electro-magnetic coils acting as pretuned springs to both extend and retract the weight 50.

Figure 2A:
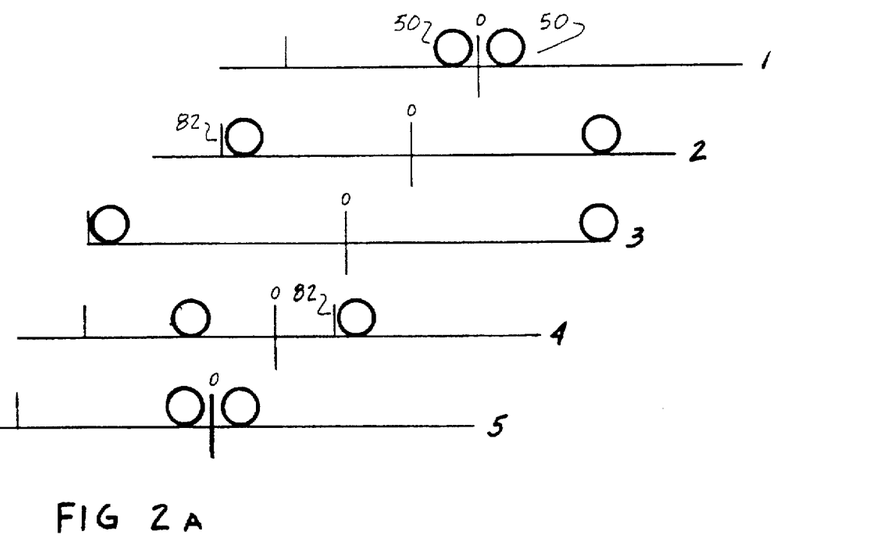
FIG. 2A is a schematic for the two-weight system shown in FIG. 2B where propulsion is achieved by ramming.
Figure 2B:
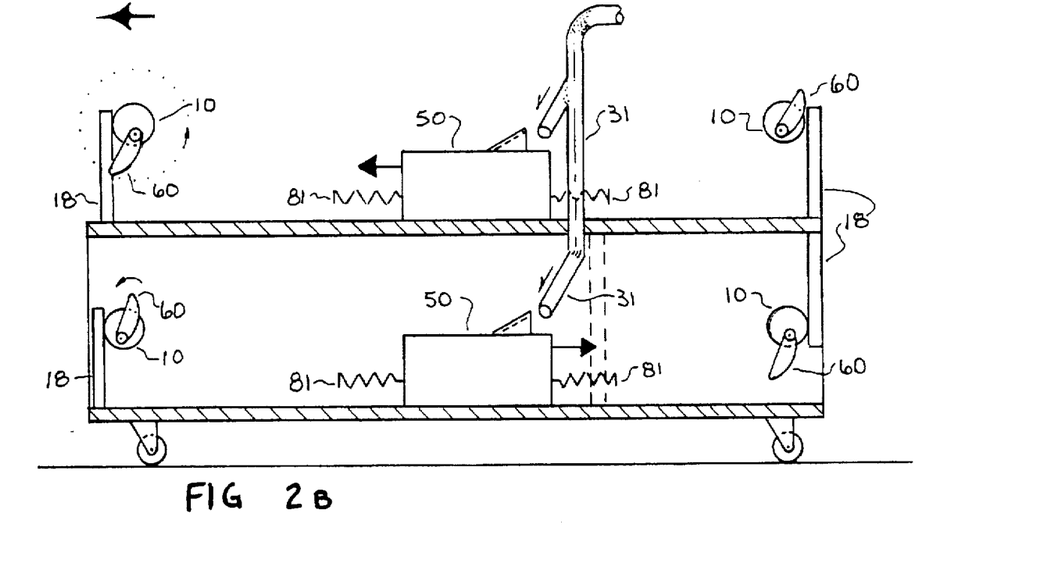

FIG. 2A is a schematic for the two weights 50,50 with collapsible pins 82,82 which impart momentum in the right direction on separation and collection. This allows the weights to complete strokes. In FIG. 2B, flippers 60 supported by posts 18 actuate weights 50. The external assist is made using air jets 31. This speeds up the weight 50 going in the direction of the large travel arrow enabling the weight 50 to reach the end of the stroke and impart its momentum to the craft before the other weight 50 completes its stroke. Return springs 81 conserve kinetic energy. This results in pulsating travel displacement.

Figure 3A:
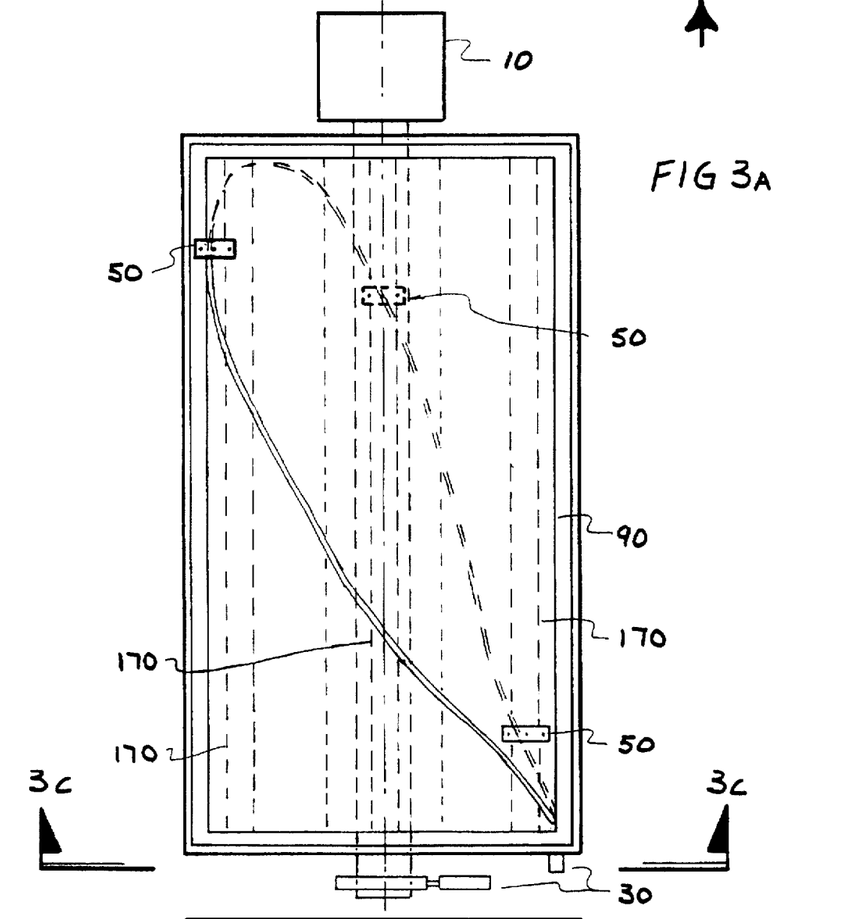
FIG. 3A depicts a 3-weight grooved-cylinder version the plot of the curve for which is shown in FIG. 3B.
Figure 3B:
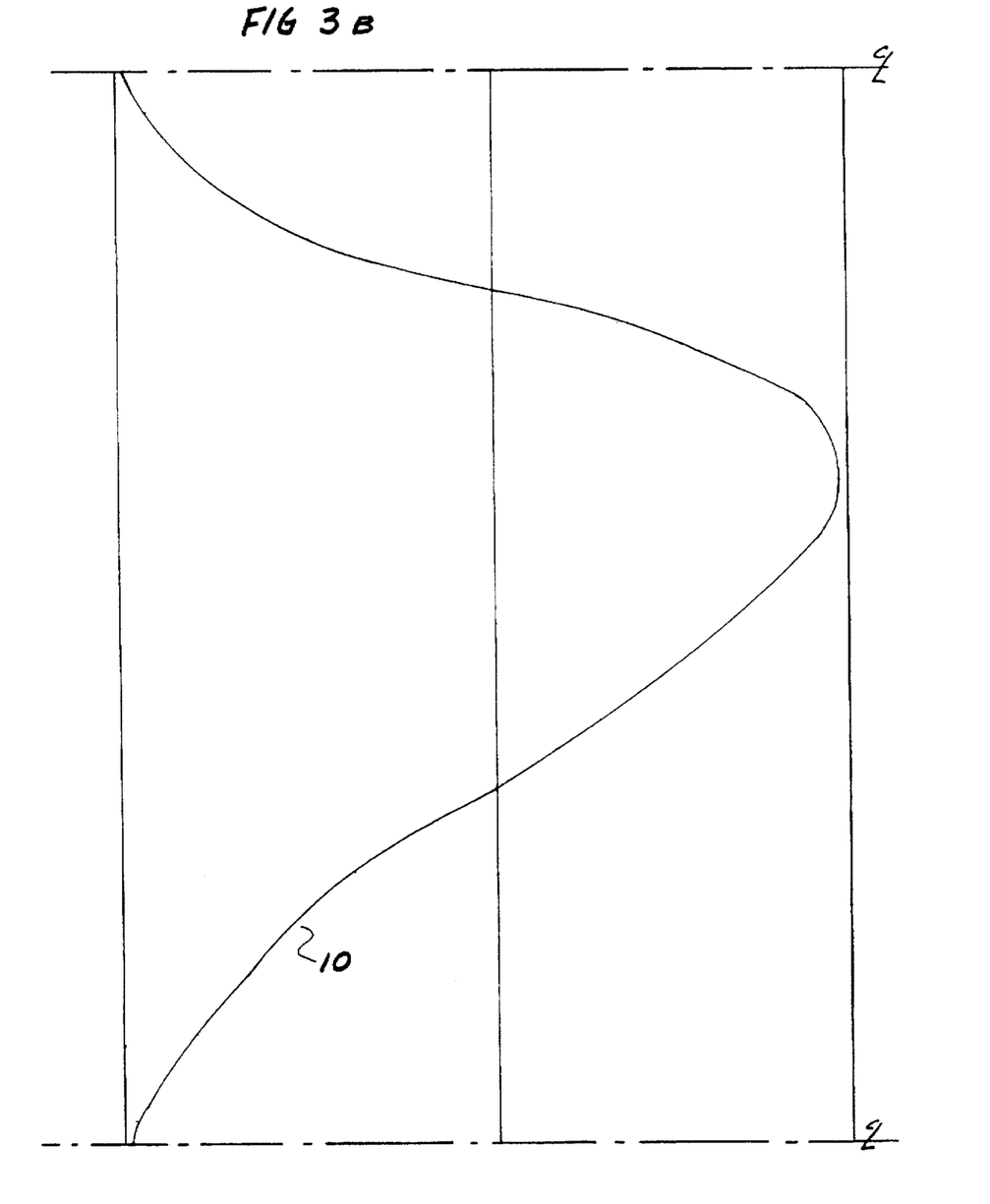
Figure 3C:
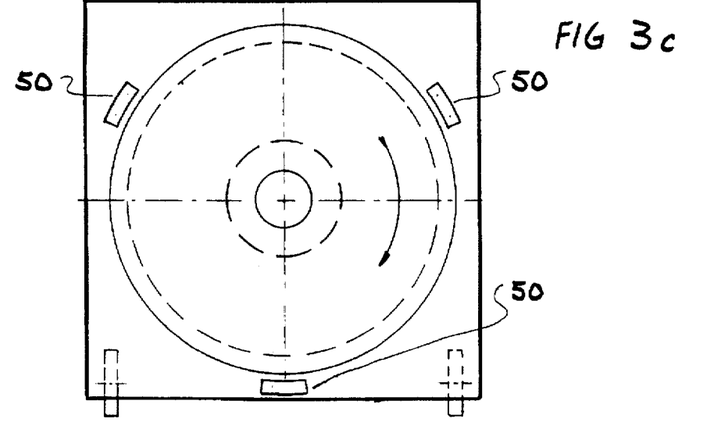
Figure 4:
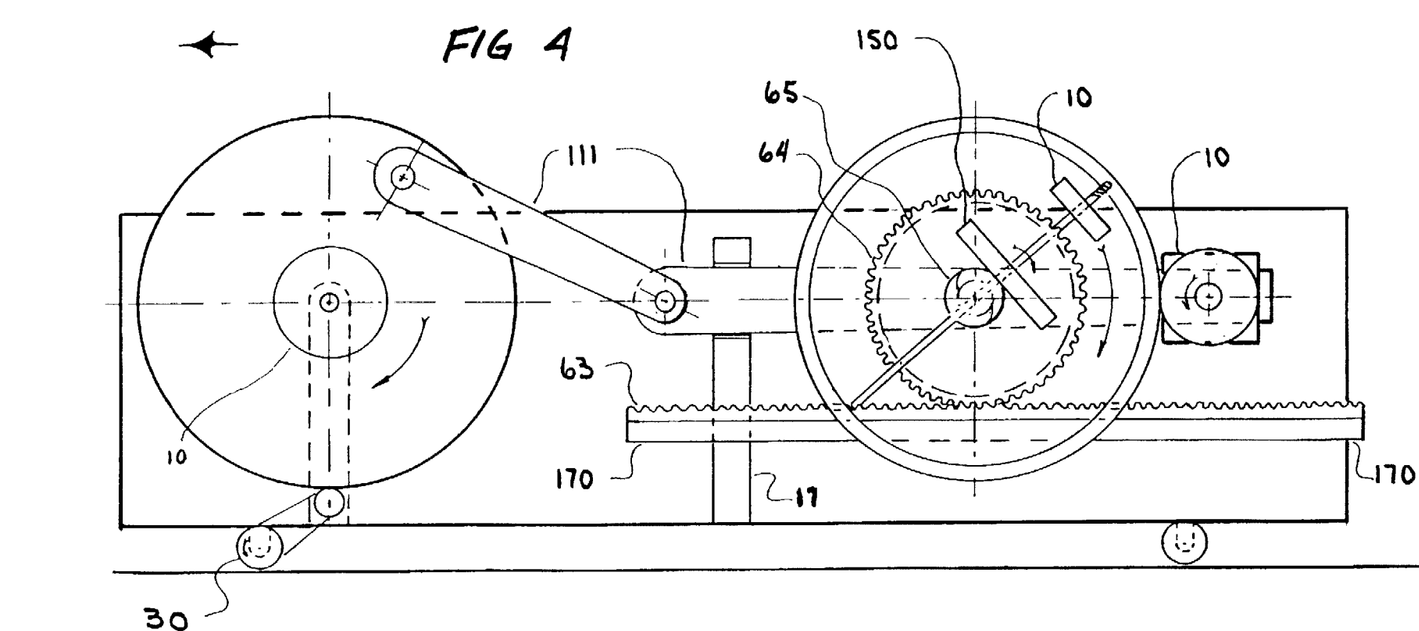
FIG. 4 shows a version whereby the weight is a spinning gyroscope.

Like FIGS. 1A and 1D, the three-weight model shown in FIGS. 3A and 3C is operational and is being further tested. The grooved cylinder 90 model has three six-pound steel weights 50 actually proportionally larger than shown in FIG. 3A and is powered with an electric motor. Weights 50 take turns in the power stroke which advances model as the weight goes rearward. The "null phase" wherein the force from the weight 50 speeding up at uniform acceleration while a counterpart, already in motion, is decelerating likewise during the duration of the second half of the return trip. Motor 10 rotates cylinders 90 and external force 30 proportional to the sine of angle of incline is derived from the pathway. It is applied to the cylinder 90 to augment forces between the actuator 60 and the weights 50. Each weight has centrally located linear bearings riding on two polished steel rods 170 for each weight 50 which have cam followers or styluses fitting into the continuous groove. FIG. 3B shows the type of modified bell curve for motion equation $S=vt+\frac{1}{2} a t^2$. There is prior art cited for grooved cylinders but not for this purpose nor for propulsion and not for managing weights. This type grooved cylinder can, instead of having each weight, during the power phase, accelerate half a stroke then decelerate second half of stroke, it can accelerate almost the entire power stroke. This would be followed by a short transition groove. FIG. 4 shows a gyroscopic version with a gyrostat 150 which spins and is tumbled out of its desired plane of rotation as it is forced rearward by crank and connecting shaft 111. The gimbal for the gyrostat 150 has teeth 64 as does the base track 63 below. One-way clutches 65 have been used on an existing model to insure that the return stroke allows the spinning gyrostat 150 to return on this null stroke without tumbling. Only minimal assist 30 derived from the pathway may be required. Sample calculations shown in the detailed description indicate that since gyroscopes can exhibit many times the force that non-spinning masses can, the relative mass ratios are different on the power stroke and the null stroke.

Figure 5A:
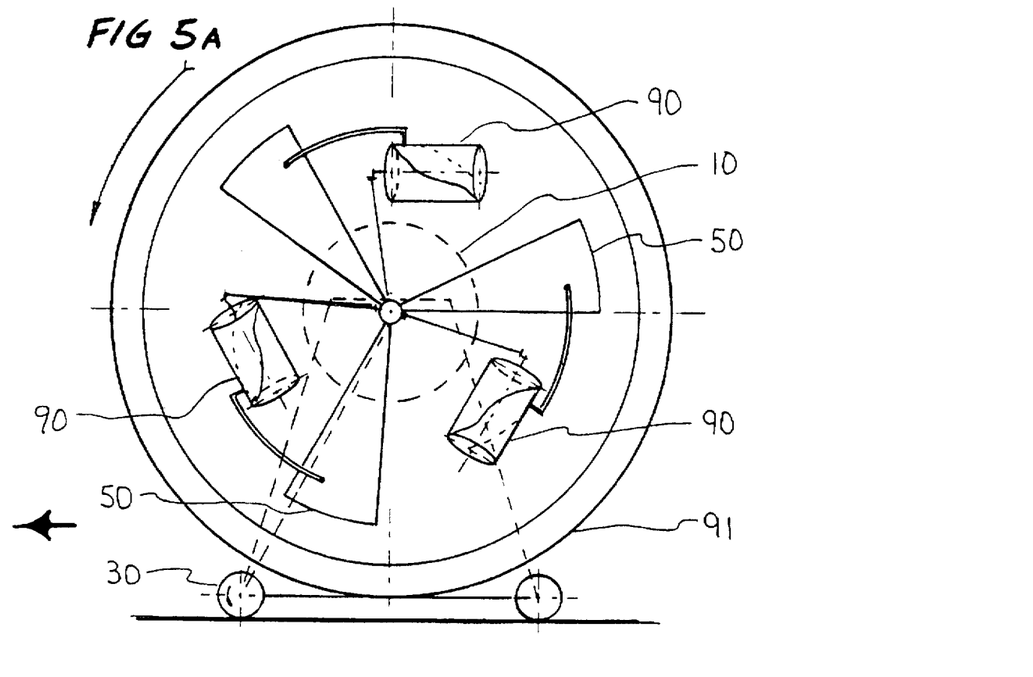
FIG. 5A represents a 3-weight rotary model and FIG. 5B represents a 2-weight rotary model.
Figure 5B:
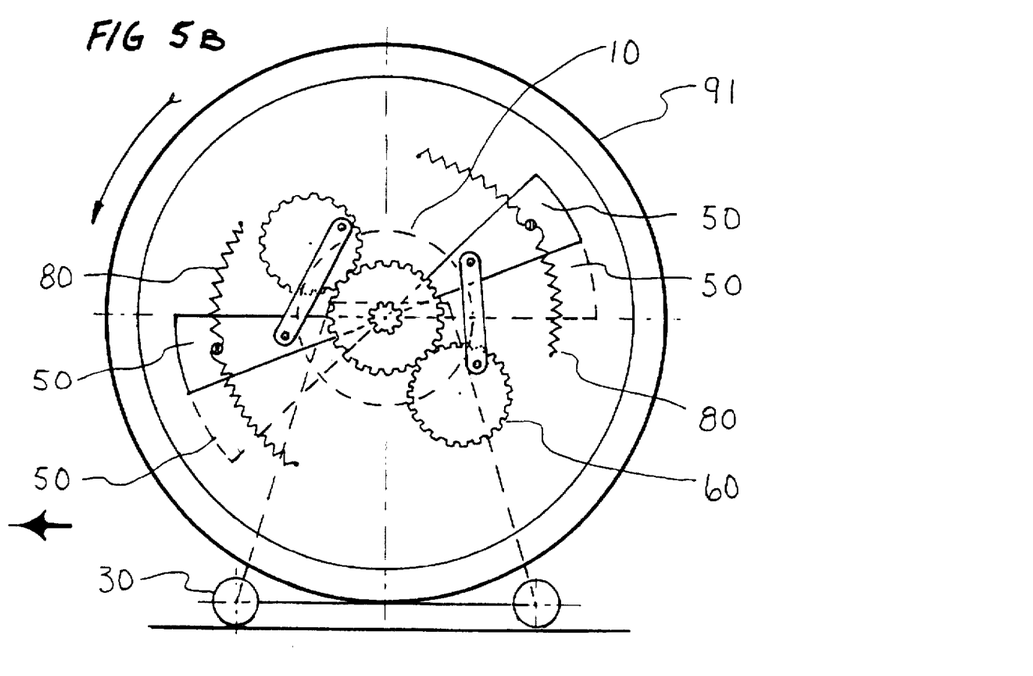

FIG. 5A and 5B show rotary adaptations of the three-weight system and the two-weight system. In FIG. 5A, the weights 50 are advanced and then retracted using grooved cylinders 90 mounted on disk 91. External assist 30 is provided by the pathway. In FIG. 5B, the weights 50 are advanced by the actuators 60 and returned by the spring system 80 much like with the one-weight system. Both are powered by engine or motor 10. The weights are centrally pivoted and slidable with respect to the rotor wheel. In FIG. 5A, the three-grooved cylinders have one weight 50 advancing in time. "t" while another weight 50 is retracting in the first half and its counterpart likewise in the second half of the return trip.

Figure 6:
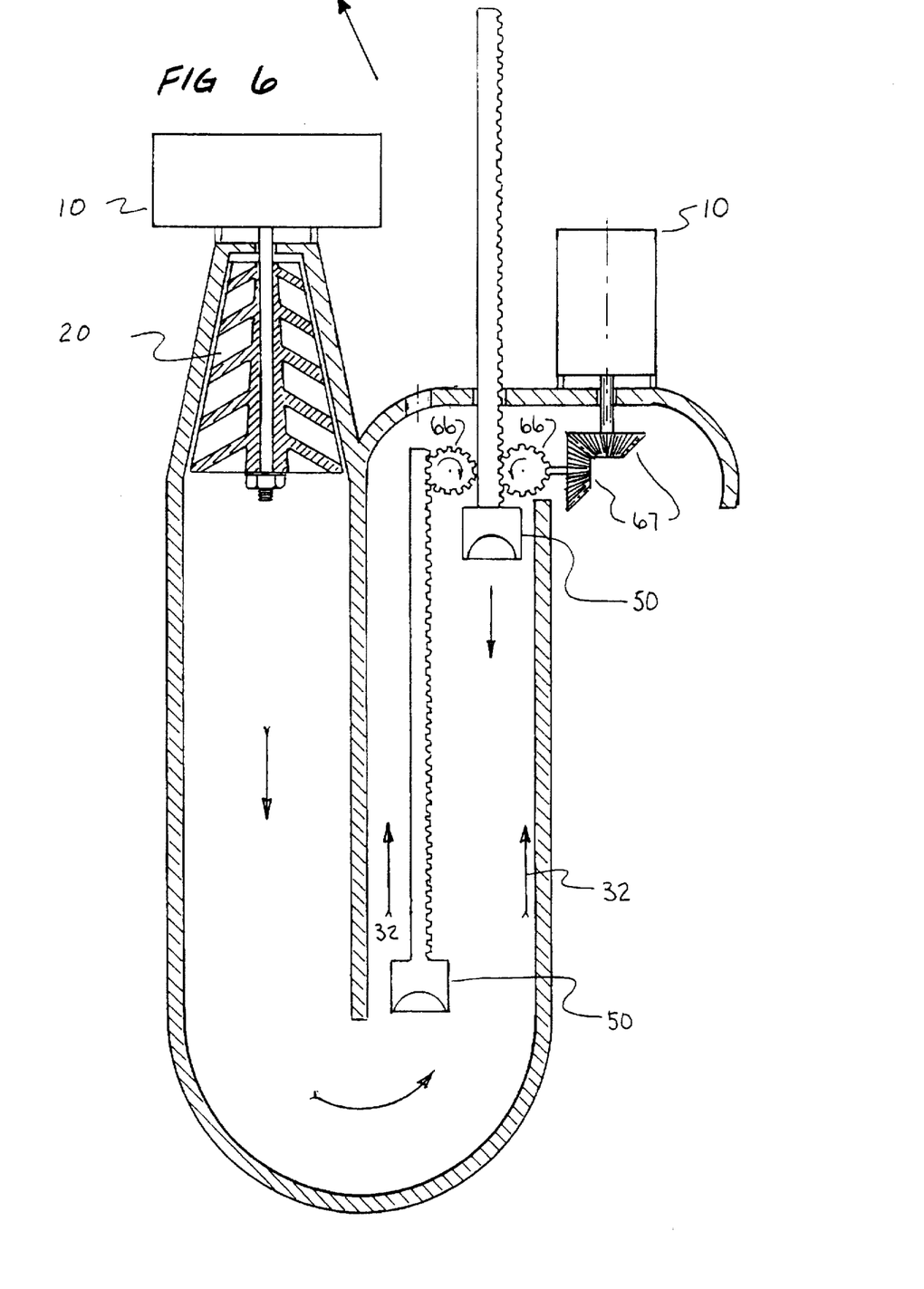
FIG. 6 shows a reciprocating model yielding lift and propulsion.

FIG. 6 illustrates one of other reciprocating models. Unlike helicopters, this one is self-contained, an engine 10 drives a blower 20 and the then upward air stream 32 is sufficient to support the weights 50 which are forced down on power stroke by motor-driven actuators 66 driven by motor 10 via gears 67. The weights 50 could be returned for reuse with any of the spring versions as in FIGS. 1A and 1D. But the exit air is directed downward and can be baffled to help propel the craft. The linear actuator 66 also driven by engine 10 can take any of many forms.

Figure 7:
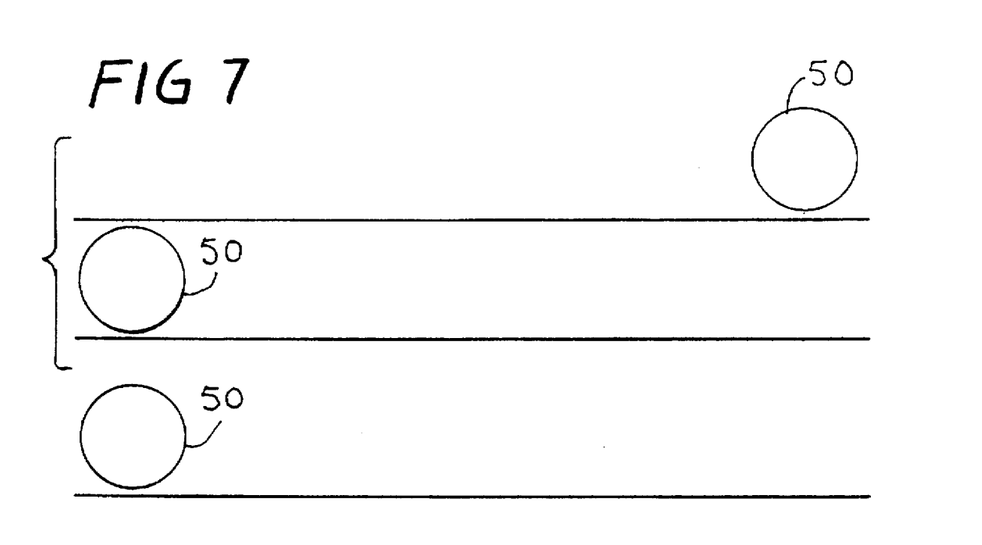
FIG. 7 is a schematic that represents the use of two opposite power phases to cancel unwanted reactions along with another power phase for propulsion.

FIG. 7 is a schematic illustrating that two opposite power phases cancel out to a null phase as in the weights 50 in a bracket. The third line or track represents a power phase in which the weight 50 moves oppositely. About the only way this scheme could be useful is if there were spare weights to return; e.g., two at a time as needed for the logistics of the system.

Figure 8A:
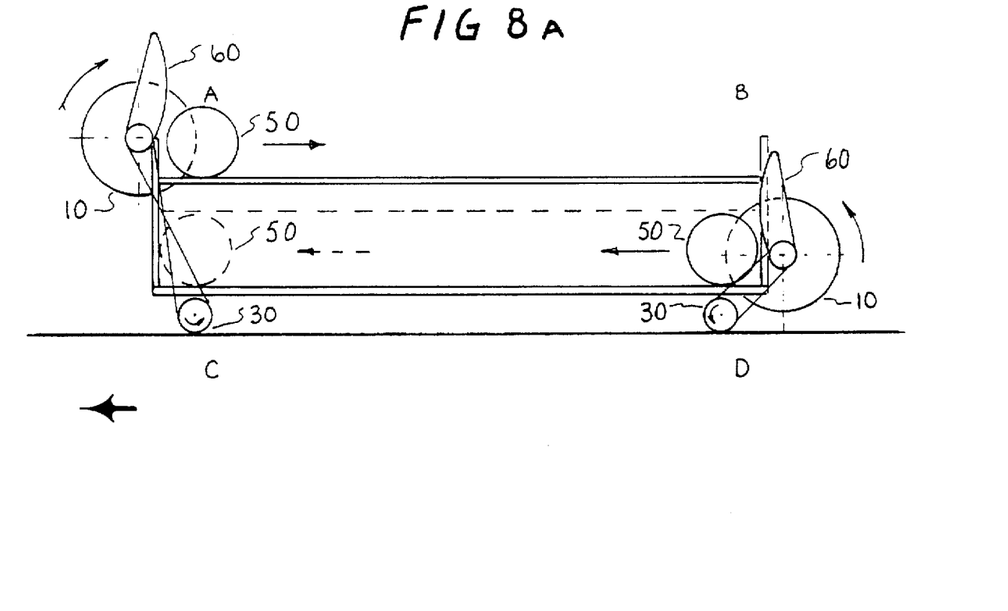
FIG. 8A is a schematic of using the impact of one returning weight to accelerate another weight return phase to cancel reactions.
Figure 8B:
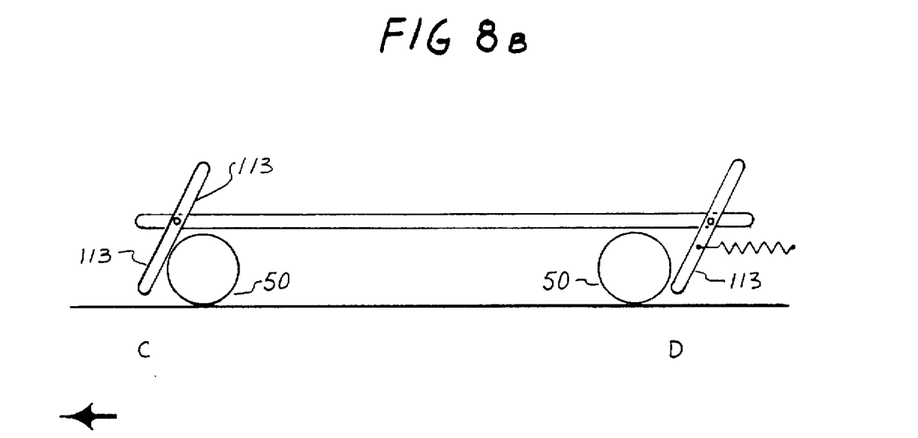
FIG. 8B represents a lever system to do this.

FIG. 8A and 8B show ways to use non-uniform travel rates wherein weights 50 reaching the end of their stroke cancel out the force needed to return another weight 50 for reuse. Generally, anytime a weight is decelerated as in FIG. 8B, which is only the return null phase, it is advantageous to use levers 113 such as in FIG. 8 to recycle the kinetic energy. FIG. 8B shows that if the weights 50 are timed, that a weight arriving at D can strike a lever 113 tied to one at C to accelerate it. There are a variety of options to accomplish this.

Figure 9:
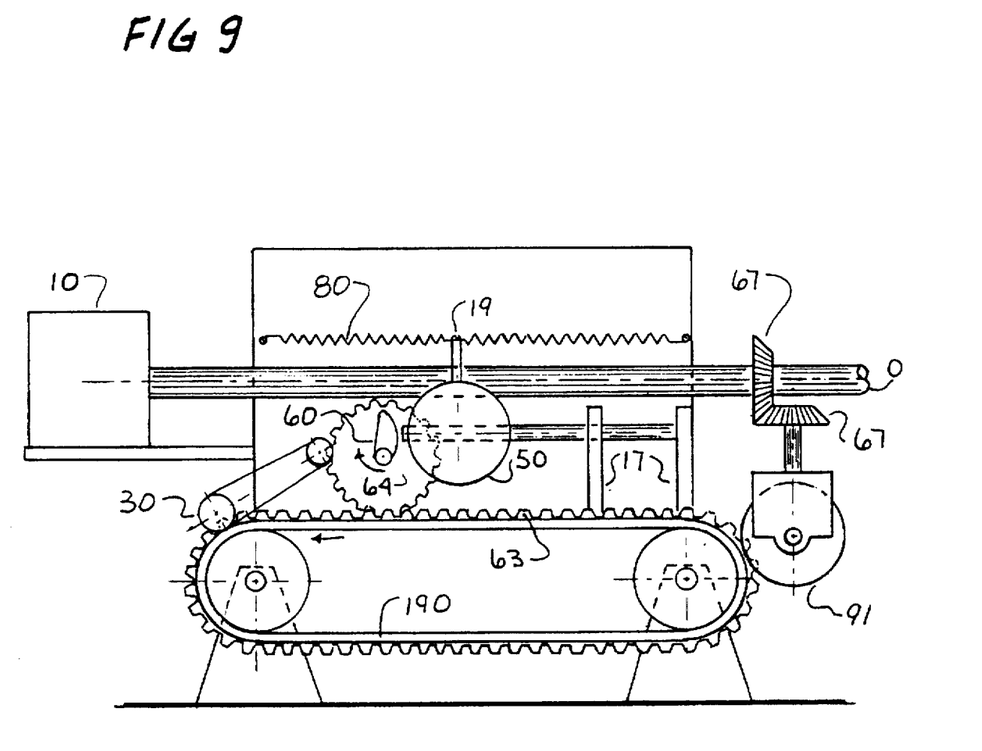
FIG. 9 shows how to harness the displacement for engines in non-travel-related tasks.

FIG. 9 shows that for non-travel related engines that the inherent displacement can be harnessed to add to the available power from an engine. For travel-related tasks, a set of auxiliary weights 50 can be employed to help move the vehicle. The engine 10 drives any inertial-plus apparatus with external assist 30 as similar to FIGS. 1A and 1D as shown in FIG. 9. In lieu of travel, the displacement is harnessed on a treadmill 190. This power is added to the power from the engine and the total output is @ shaft 0. Optimally the inertial machine may travel about an oval back to localize it to its vicinity.

Figure 10B:
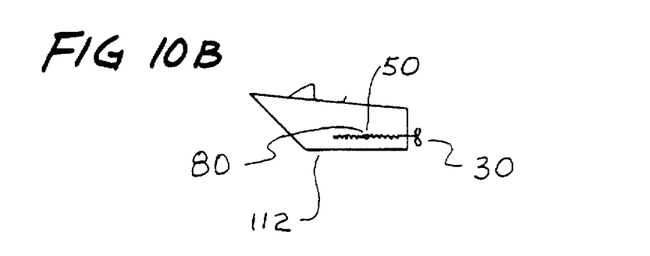
Figure 10C:
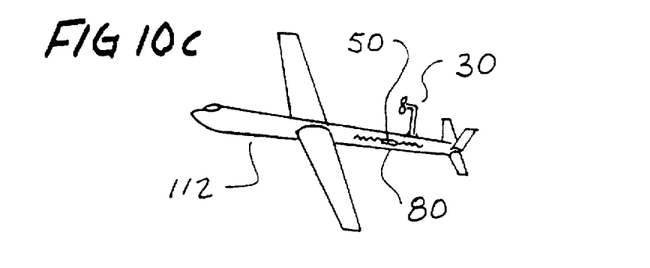
Figure 10D:
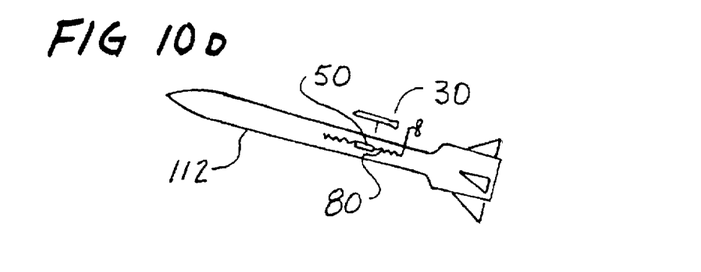

FIGS. 10A, 10B, 10C and 10D show graphically some types of external assist 30 or 31 required for inertial-plus propulsion. FIG. 10A shows a land craft upgrade having the weight track tilted back, although it can be level. Thus, one can have gravity assist. FIG. 10B shows a boat with a small screw propeller to provide external force assist to between weight and craft. Likewise, FIG. 10C represents an airplane flying with a small propeller, in this case for external assist to the weight 50. A craft in microgravity so powered in space needs a small rocket for external assist to augment the force exerted between weight 50 and the craft 112.

DETAILED DESCRIPTION OF THE INVENTION

Since there are eight or more different ways to zero the effects of resulting reactions known to this applicant, there are likewise that many drawings. All of these have a power phase which is common knowledge alternated with a null phase to cancel out unwanted reactions. Efforts are made to recycle the kinetic energy of decelerating weights which can be done in a reciprocating process. Where other external force is applied, generally between the weights and the craft, it generally must be done for both phases, although gravity assist is possible especially in the null phase having a reversely tilted track. Synchronization of the reactions with the actions must be maintained. It can naturally occur but sometimes facilitated by a power synchronizer. Otherwise, scrambling will occur which will adversely affect the travel progression. The drawings FIGS. 1A and 1D and 1B and 1C through FIGS. 10A, 10B, 10C and 10D depict sketches of each type of Inertial Propulsion Plus. Laterally deployed smaller units can be used for steering. Braking can be done by reversing the process and having the null phase retract the center of gravity rather than advancing it.

FIGS. 1A and 1D show pretuned stretched extension springs attached to a slidable weight 50 which returns the weight for reuse without any adverse effect on the model(s). For some models, the springs can be independently stretched and be coupled and uncoupled from the weight. This way is completely neutral as to its effect on $M_1$.

For any of the type machines require some external force to be added to the force exerted between the weight(s) and the craft. This may be obtained in sufficient quantity by an on-board multi-stage pilot unit. This could be increased by; e.g., a three-stage unit of inertial propulsion units beginning with an air scoop and becoming greater with each stage's output until it is great enough to satisfy the main driver unit.

Most any appropriate power source 10 including nuclear can be used. Besides using coil or leaf springs, the null stroke can be pneumatic as FIG. 1B or electromagnetic as FIG. 1C. The springs ahead of the weight 50 and behind it need not even have the same stretch indices; i.e., inches per pound. They do need to be roughly compatible so that when released the decreasing tension on the forward spring is accompanied by a corresponding increasing tension of the rearward spring. Thus the reaction upon release of the weight is completely countered by the rearward spring which completely absorbs this reaction as it returns to equilibrium. Then the variations as of FIGS. 1A and 1D and FIGS. 1B and 1C, when properly executed, can totally handle any reaction the driving force can produce. A system dealing with hundreds or thousands of pounds must be strong enough for the task. For example, using the model in FIGS. 1A and 1D and without the flippers touching the weight 50, one can release the manually-displaced-to-the-rear weight 50. This has no adverse effect on $M_1$ the craft, the mode as weight is returning to equilibrium. With a one-pound tension on the springs at rest, the tension on the front of the model becomes one and one-half pounds and on the rear of the model one-half pound. The maximum driving force is 1½–½=lb. which becomes 1 lb.–1 lb.=0 at rest or equilibrium. But on the return null phase, the $\Delta f$=1½–1#=½ lb. loss to the front while the net gain in the rearward spring is 1–½#=½ lb. gain. This relationship is true for however great or small the tension even thousands of pounds. Also, dynamically, when the model is in operation, there is an imbalance of forces as they affect $M_1$ the craft. Therefore, the thrust of the power phase must be >1 lb. for the model to travel. This model has extension springs and must be operated in a range to where the opened loops do not close. A variety of stock springs, both extension up to 145 lbs/inch and compression springs, are available from the Gardner Spring Inc. of Tulsa. Either type can be used with these limitations. The above condition must also be observed with pneumatic cylinders or electromagnetic springs.

Inertial Propulsion tends to require a power phase alternated with a null phase to cancel out unwanted reactions. Even gyroscopic propulsion, as in FIG. 4, must have a $M_1/M_2$ effective weight ratio more nearly equal on the power phase as regards the null phase or non-tumbling.

Traditionally, the non-ejected weight 50 $M_2$ may have an excess of momentum MV on the power stroke which would tend to drive the craft $M_1$ 51 back to its prior position. So, with Inertial Plus, some of this force can be countered with pure external force and shunted to ground. Likewise, the other function of the assist is to either support the weight itself for vertical travel or partially support it for upgrade. With reciprocation, it is relatively easy to get internal forces equivalent to more than 10 G's. But the upward opposite travel of $M_1$ can absorb all but 1 G with vertical travel. For horizontal travel, with no friction nor obstacles to advancement, all the force can be absorbed. The craft $M_1$ and the weight $M_2$ will continue to travel in opposite directions relative to each other until the end of the stroke. Since both $M_1$ and $M_2$ move apart inversely proportional to their relative mass, then the weight must return a greater distance for reuse. This means the total; e.g., 1+10 or 11 units of distance on the null phase. But once the system gets going, this stop and go becomes speeded up and slowed down each stroke or pulsating travel. But any ripple, if it does occur, can be smoothed out by blending in residual pure external force. Experimental results have been encouraging. Net displacement in itself sets up a progression rate in its own right and residual and added momentum at the end of each cycle makes possible high travel velocities.

These basic and fundamental systems should not be confused with methods which rely on friction to retain position and having a fast stroke in one direction alternated with a slower stroke in the other direction. Even these have some useful applications but differ greatly from the types described by this applicant. Nor is the old reliable pendulum test a good criterion except if it were performed in space as external force may be required on earth. Weights can be in the form of fluids circulated or even clusters of particles blasted back and forth. The $M_1/M_2$ mass ratios may vary greatly over a wide range from 1 to 1 if employing only one weight but typically 10 to 1 or even greater. Stroke length may range from a few inches to many feet for large crafts. As for the stroke times, the null stroke can be even faster than the power stroke if desired as this is not a factor. Instead of working due to friction, these new concepts need as little as possible friction. But to have a large thrust, the mass of the craft may be large; i.e., loaded.

FIG. 2A,B is for a two-weight momentum drive system. The two weights 50,50 can be like cannon balls on tracks and interceptor pins 82 to intercept the weight going in the desired direction, allowing it to impart most of its momentum MV to the craft it strikes before the rearward weight 50 reaches the end of its stroke and slows the craft. Pulsating travel occurs, although on earth the ripple can be smoothed out with external assist. Conversely, on the return strokes, the weights are forced back by a flipper or otherwise back toward their initial positions. On this phase, the rearward one, now going in the desired direction of travel, is intercepted by another collapsible interceptor pin 82. In both cases, the weights are allowed to complete their strokes. The necessary external force assist can be provided to desired weight by these flippers or boosters or by any other appropriate means. This additional speed of that weight 50 means that it will reach interceptor pin more quickly than the one which decelerates the craft. For any type, the flippers have been made to uniformly accelerate half way or fully while the weight is being accelerated. Brush type boosters midway will boost the speed of the weight and can be used in lieu of the air jet accelerator.

FIG. 3A shows a 3-weight system. An existing 66 lb. model has three six-pound weights 50 much larger in proportion than shown in the drawing. Each weight 50 has two parallel linear bearings and rides on two polished steel rods. The weights have cam followers which fit into the ½ inch continuous groove in a 6⅝ inch O.D. aluminum cylinder which is 14 inches long for a 12 inch stroke. The curve for this cylinder was plotted from the motion equation S=vt+½ a $t^2$ and was plotted and enlarged more precisely than FIG. 3B indicates. There was prior art later found for grooved cylinders but not for handling three weights where the return phase reactions cancel out. One of the weights is always outbound as the cylinder is rotated by an electric motor. The other two weights at any given time have one speeding up at constant acceleration in the first part of its return trip while a counterpart already in motion slows down likewise at the same value of constant deceleration. The weights take turns and the outbound power phase makes a stroke in time 't'. But the returning weights take a time 't' for a half stroke. The entire return or inbound stroke takes time '2t'. The power phase can have a weight speed up to on-half stroke or almost the full stroke before decelerating to the end of the stroke as in the case of a spare grooved cylinder. So, while the power stroke of accel/decel is sequential, the return stroke is simultaneous. Also, the power stroke and the null strokes are simultaneous although a design option using actuators can have sequential as in the case with other types. In horizontal operation on earth, these equal but opposite forces cancel out to zero. An external assist 30 like a roller on the pathway taking any of the many possible forms is required. This assist adds to the forces exerted by the cylinder to the weights.

On earth, this small assist can be a small wheel in contact with the road or it can be to the support wheels. On water, this assist can be done using a small dummy screw propeller or through the existing one. Likewise with an aircraft, inertially propelled, the assist can be through the prop or jet or to a dummy one. There can even be combinations of hybrids like an inertially-assisted conventionally-propelled craft. In a helicopter-like craft, a nozzle-type air stream can be used to support the oscillating weights.

FIG. 4 Gyroscopic Model. Since a gyroscope can produce many times the inertial force resistance as can a non-spinning weight when forced out of their plane of rotation, one or more gyros can be effective to produce propulsion. The idea in this type system is to force the gyro unit away from the craft as this gyro is forcibly tumbled out of its plane of rotation. The gyro unit is then returned for reuse without tumbling. The one shown has only one weight (gyro 150) although e.g., three gyro units can be utilized similar to FIG. 3A. Likewise in FIG. 4, the gyro unit is labeled (150).

The gyro unit(s) can be managed in a rotary system. They can also be managed in a reciprocating fashion. All it takes is a double rack and pinion track and a motor-driven reciprocator that moves the gyro unit outbound while tumbling and retract them for reuse without tumbling; i.e. while maintaining its desired plane of rotation. This is done by use of one-way clutches on the gimbal-pivoted-rings for the gyro unit.

Since this process actually constrains the craft as well as the gyro unit on the power phase, the mass ratio of the gyro to the craft is much greater on the power phase. As long as one gets in between the force couple of the twist, effective resistance will occur.

FIG. 6 shows other reciprocating systems. This figure shows a sketch of a craft that could replace the common helicopter for many applications such as rescue tasks. Since there are no exposed rotor blades or props, they will be much safer near mountains and also for fires in high rise buildings and rescue tasks.

This is only a sketch representing necessary components for such a craft and not the actual design which can take many forms.

In this example, the weights 50,50 are supported in a vertical air stream 32 in a stack. A blower or small prop provides the small external assist by the air stream in the stack enough to support the weights not the entire craft. This air stream can also be used to help guide and steer the craft. Meanwhile, mechanical actuators cause the weights to go up and down in this stack. Even then, nulling springs or else a double acting pneumatic cylinder with pot reservoirs at each end may be required to cancel out the return reactions. Electromagnetic coils and fields can be used to mimic the actions of extension spring systems.

FIG. 7 represents a "null phase" component using any two opposite "power phases" and variable weight $M_2$ units to maintain the needed mass transfer for the logistics of the process. Thus some strokes have a one-weight unit while others have two weights on the same stroke to maintain the continuity of the process. Then adjunct and opposite power phases can be used alternated with a single power phase in the selected direction for travel.

FIG. 8 depicts miscellaneous e.g. pairing up of end points to "null out" effect.

In lieu of uniform accelerating and decelerating the weights as done in previous cases, the weights 50 may travel at constant velocity e.g. like bowling balls and be tossed by a flipper or other actuator. The $M_2$'s can be the form of clusters, particulates, powders, or else fluids blasted across the enclosed course and received on the other end and returned back and forth. The $M_2$'s in any form can be forced backward and the craft go forward each pulse. The $M_2$ leaving the rearmost part of the course may be timed just as the previous $M_2$ is impinging in front. This cancels out these effects in horizontal operation.

A design goal is to try to recycle the kinetic energy of decelerating weights to help power the system. Rods and levers can be used to transfer the kinetic energy from one end of the track to the other end of the same track or as accelerating or decelerating $M_2$ is in the return path or track.

The $M_2$ can even strike a lever near the end of the stroke and apply the kinetic energy electromagnetically through wires to accelerate the $M_2$ being forced away from the craft.

Another design choice is to "connect" each $M_2$ on the power stroke. The weights can be fitted with tow strips so that near the end of each power stroke the tow strip engages the next weight and puts it into motion and so on. This can be done without any direct effect on $M_1$ the craft.

Rotary models, FIGS. 5A and 5B. This system works similarly to the one-weight unit in FIGS. 1A, 1D, 1B and 1C or even the three-weight unit in FIGS. 3A and 3C. Sector-designed weights are more applicable for rotary systems but in effect they are very much alike and merely mounted on arms or disks and provide thrust by rotating around these thrust forces. They can be used laterally to provide steering as well as reversed for braking. FIGS. 5A and 5B depict two different ways of producing a null phase on the return stroke.

FIG. 5A illustrates a three-weight model wherein the forces on two of the weights at any given time are canceling out on the null phase. FIG. 5B shows a two-weight rotary design which employs the nulling spring arrangement. This also can be done with a pretuned pneumatic cylinder or else by electromagnetic coils which serve as springs. One returns the weight and the other cancels out the reaction completely.

FIG. 9 depicts harnessing displacement to provide power from an engine.

The net displacement potential for non-travel-related engines can be converted to rotary motion with the engine power source in place. On earth, a very small external source assist may be used resulting in obtaining power for stationary use.

FIGS. 10A, B, C and D. Inertial Propulsion Plus is used in a gravitational field which requires some pure external force derived from the pathway to be blended in to give a highly useful hybrid. With inertial plus device assisted properly to the weights using a pencil jet or rocket will result in greater thrust. On land, there may be a small fifth wheel or existing wheel(s) in contact with the roadway and a shaft leading to and helping the actuator that manipulates the weights. In water, likewise the assistance can be by a small prop or existing prop. In air, there can be a small prop or existing prop or jet. For helicopter-like vertical travel machine, there can be a small enclosed prop or turbine in a stack or a blower sufficient to externally support the weights.

In general, even with the alternating of a power phase to null phase which changes and advances the center of gravity, this process can only work in a horizontal plane and even then with no friction or obstacles to advancement. Upgrade also needs some pure external assist derived from the pathway and proportional to the sine of the angle of incline. By meeting these basic requirements, a highly useful combination or hybrid can be obtained. This assisting force is usually applied to the force being exerted between the craft and the weight.

FIGS. 10A, B, C and D is a sketch of this process for various media.

For upgrade travel on earth, Inertial Plus with minimal assist may just cause the craft to move less each stroke than will horizontal travel. A slidable ratchet-type escapement fastened to the three-weight model and sliding on an all-thread rod has been used to get the reactions in synchronization with the actions.

A concentric dwell ring groove can be utilized at the ends of stroke using a grooved cylinder to facilitate phase timing. Also, if sequential power phase then null phase rather than simultaneous, it can be done by means of a constant velocity mid section of the return null phase. This is a design option.

With external assist between the weights and the craft, a power phase followed by a null phase and repeating is all that it takes to get unidirectional motion or called self-contained propulsion.

The spring model cannot kick back as long as the sets of springs are roughly compatible. Anyone should try this to verify that it changes center of gravity.

In FIGS. 5A and 5B, the rotary models can have a harmonic balancer or else design the weight strokes on a slant to maintain balance as it moves.

With, for example, a 10 to 1 ratio of $M_1/M_2$, $M_1$ moves only 1/10th of that for $M_2$, so since they are on the same base, relative acceleration versus actual is not significant on the power stroke. $M_2$ falls behind $M_1$ and then catches up on the null phase.

Weights including gyro's take hold where they are so if already in motion, the force through a distance is like a dotted or dashed line in that you can have skips on the power phase since much force can be generated for a short impulse of duration of the stroke. The distance $M_1$ the craft moves may be increased using levers each stroke. "Inertial Propulsion Plus" gives something to push against and the push. Other applications of Inertial Propulsion Plus may include recoil systems and suspension systems.

How It Operates

All of these examples of reaction propulsion devices in art group unit 3502 were made workable by extending a craft and weight(s) apart by reacting against each other and returning the weight for reuse while cancelling out the return reactions. But since for upgrade travel, the craft is harder to move and the weight less able to move it, some outside or external force derived from the travel medium must be selectively applied to the weight(s) itself rather than to the craft. The latter would have added the same force to the craft and the weight and thus not change this otherwise balanced system. But by applying this outside force to oppose the weight, but in the direction of travel, causes the actuator to exert a greater over-riding force to propel the craft. This also is enough to prevent the weight from ramming the craft back to its prior position. The craft's reaction each stroke is great enough to absorb most of the reaction.

The return phase reactions can be cancelled by spring means or by having two or more weights react simultaneously i.e. go apart as with the two-weight apparatus and the three-weight apparatus. The three-weight apparatus has one weight at constant acceleration during the first half of the return stroke, while a prior weight, already in motion, likewise decelerates at the same constant value during the second half of the return stroke. Thus, these return reactions cancel out to zero. In any case, a small external assist must be applied to the weight(s) in the travel direction to prevent the weight from causing the craft to return to its prior position. A small excess of external force assist will add residual momentum each stroke and yield increasing velocity to the craft.

Reversing the process can be used to provide braking and laterally deployed smaller auxiliary units can provide steering.

Placing and securing any of these units on a disk or turntable can add to the power derived from an engine for stationary or non-travel-related applications. The propulsion device must travel around in an oval or circle. To have the device remain stationary and the weights react against belts on treadmills tends to require two belts or disks to make the equal and opposite direction action and reaction separate or can be done in opposite directions on one treadmill belt also serving as the weight.

FIG. 1A and FIG. 1D elevation and plan views have motor 10-driven actuator 60 turning about 180 RPM which cyclically drives a 4" long by 1" rod 50 connected forward and rearward to model by prestretched spring 80. Weight goes 2" rearward as the model goes forward in direction of travel arrow. Weight 50 releases and is returned for reuse by spring system which also absorbs the reaction. External assist enough to keep weight from ramming the model back to its prior position is provided by a friction wheel to a slipping wheel to brake the actuator causing a greater overriding force from the actuator. Continuation of this process gives travel.

FIG. 1B has an air-driven means to force the weight 50 rearward as the model goes forward. A separate pneumatic cylinder 20 has been recharged and returns the weight to equilibrium without affecting the travel process. External assist is provided by a friction wheel 30 to oppose the rearward travel of the weight enough to prevent back-sliding.

FIG. 1C works much the same as the others but uses controlled electromagnetic fields 20 which are wound so as to provide the driving means as well as cancelling the return reactions as weight 50 returns to equilibrium. External assist 30 is provided by a friction wheel opposing the rearward travel of the weights and enough to keep the weight 50 from ramming the model back to its prior position.

FIG. 2A for a two weight system is a sketch showing how forcing one weight 50 forward simultaneous with forcing a second weight rearward to the same extent cancels out reactions. FIG. 2B shows the apparatus using two on-board air jets 31 to add to the velocity of the weight 50 going in the desired direction to reach the end of its stroke before the other weight strikes and slows the craft. This provides enough external assist to prevent back-sliding. Timed actuators 60 driven by motors 10 keep the ramming process going. The springs 81 shown conserve and recycle the kinetic energy.

FIGS. 3a and 3c show plan and elevation views of a 3-weight model whereby one six-lb. weight 50 is always going rearward as the model goes forward while two others 50 are returning forward in response to the grooved cylinder 90 which is rotated by motor 10. There is always one weight 50 speeding up in the first half of the return stroke while another already in motion is slowing down in the 2nd half of its return trip. This cancels out the return stroke reactions. The right amount of external force assist is provided in this case by a friction wheel 30 to add to the forces exerted by the cylinder 90 working with the parallel steel rods 170 to the weights 50 to make it travel by preventing back-sliding to prior position.

FIG. 4 shows a propulsion system wherein the weight(s) is a spinning gyrostat 150 which is forced tumbling out of its preferred plane of rotation on the outbound stroke by means of a second motor 10. This much more effective force causes the model to travel in the opposite direction. Then the gyrostat 150 is returned for reuse without engaging the twist by means of one-way clutches 65. An optional spring means 80 could be used if desired to completely cancel the return reactions. An external force assist is applied to the weight(s) 50 i.e. gyrostat 150 to prevent it from driving the model back to its prior position.

FIG. 5A has a disk 91 upon which are mounted three sets of grooved cylinder 90 actuators driving weights 50 to, in turn, each advance its weight. This exerts an opposite force on the disk 90 about which the disk rotates around and travel occurs. External assist to the weights is provided by a friction wheel 30. The weights 50 are returned for reuse, in order, and these forces cancel out without returning model to prior position each stroke.

FIG. 5B likewise advances weights 50 much as the one in FIG. 5A and the external force assist 30 is similar. The weights 50 are returned for reuse by springs. Enough external force assist 30 is used to prevent the model from being driven back to its prior position each stroke.

Since the craft and the weights 50 shown in FIG. 6 react upon one another, a useful application would be an air vehicle much like a helicopter. The two weights 50 are forced up and down in a stack or chamber and an upward air blast 32 supports and returns the weights and provides the external force assist 32 sufficient to prevent the craft from returning to its prior position. The two engine-driven weights churn up and down in the stack for lift and the return phase can be augmented by springs 80 (not shown). Two engines 10 are shown in FIG. 6 although one engine could be used.

In FIG. 8A, there is one weight 50 forced by an actuator 60 outbound to the right which causes the model to travel left. There is a weight 50 flipped forward at the instant a prior returning weight impinges at the front end of stroke cancelling out the return reactions. Enough external assist 30 is applied from the friction wheels to prevent back-sliding.

FIG. 9 shows a craft such as FIG. 1A and 1D on a treadmill whereby the displacement is harnessed for stationary power applications.

FIGS. 10A, 10B, 10C, and 10D show how external assist 30, 31, or 32 can be applied to the weights 50 for various travel media. The inertial-propulsion-plus devices such as for FIG. 1A of course, are on board and the external assist 30 is designed to oppose the motion of the weight 50 on the power stroke causing a greater overriding force to be exerted on the weight on the power stroke. Enough external assist 30 prevents the weight 50 from ramming the craft back to its prior position.

I claim:

1. A reaction propulsion device comprising a craft having a frame; driving means mounted on said frame; an external force assist carried by said frame and aiding in moving said frame in a first forward direction; said external force assist comprising any one of a friction wheel or small jet or rocket; weight means carried by said frame for relative movement therebetween; said driving means cyclically and reciprocally driving said weight means from an initial position relative said frame; said reaction propulsion device to cyclically move in said first forward direction when said weight means is cyclically moved in a second opposite rearward direction by said driving means; said external force assist providing enough force to the frame in the forward first direction to prevent any back motion of the frame when the weight means stops, reverses direction, and returns to its initial position.

2. A reaction propulsion device as in claim 1 comprising spring means for returning said weight means to said initial position.

3. A reaction propulsion device as in claim 2 wherein said spring means comprise any one of coil springs, pneumatic springs, or electromagnetic springs.

4. A reaction propulsion device as in claim 3 wherein said pneumatic springs have pot reservoirs at each end of said pneumatic springs.

5. A reaction propulsion device as in claim 1 wherein said weight means comprise two or more weights cyclically driven.

6. A reaction propulsion device as in claim 1 wherein said weight means are reciprocated by grooved cylinder means.

7. A reaction propulsion device as in claim 1 wherein said weight means comprise a spinning gyroscope.

* * * * *